May 15, 1951 S. W. MARTIN 2,553,058
WHEEL BALANCING MACHINE
Filed Jan. 8, 1947 3 Sheets-Sheet 1

INVENTOR.
SIDNEY W. MARTIN
BY
Harness, Dickey & Pierce
ATTORNEYS

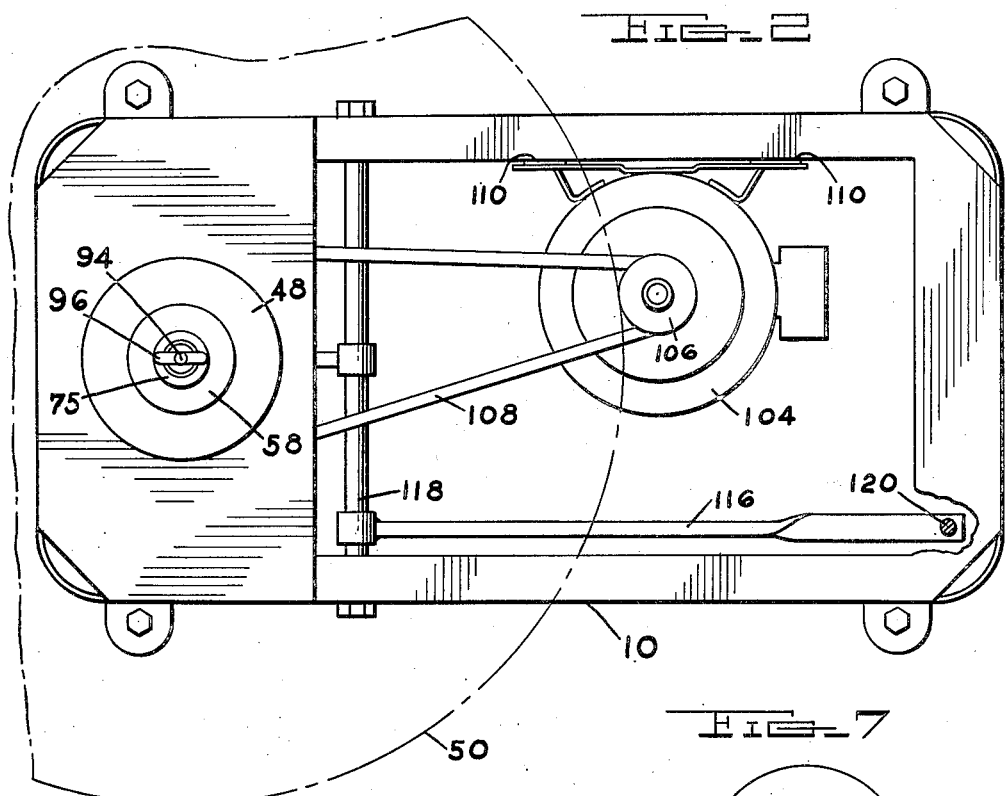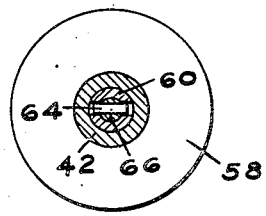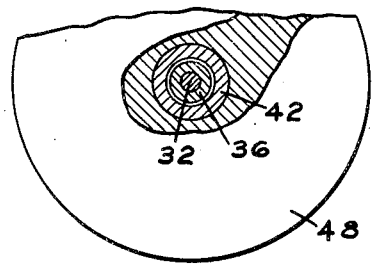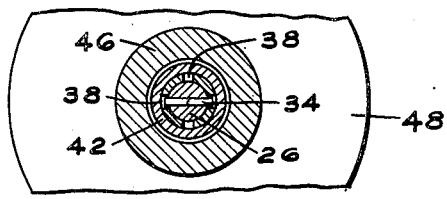

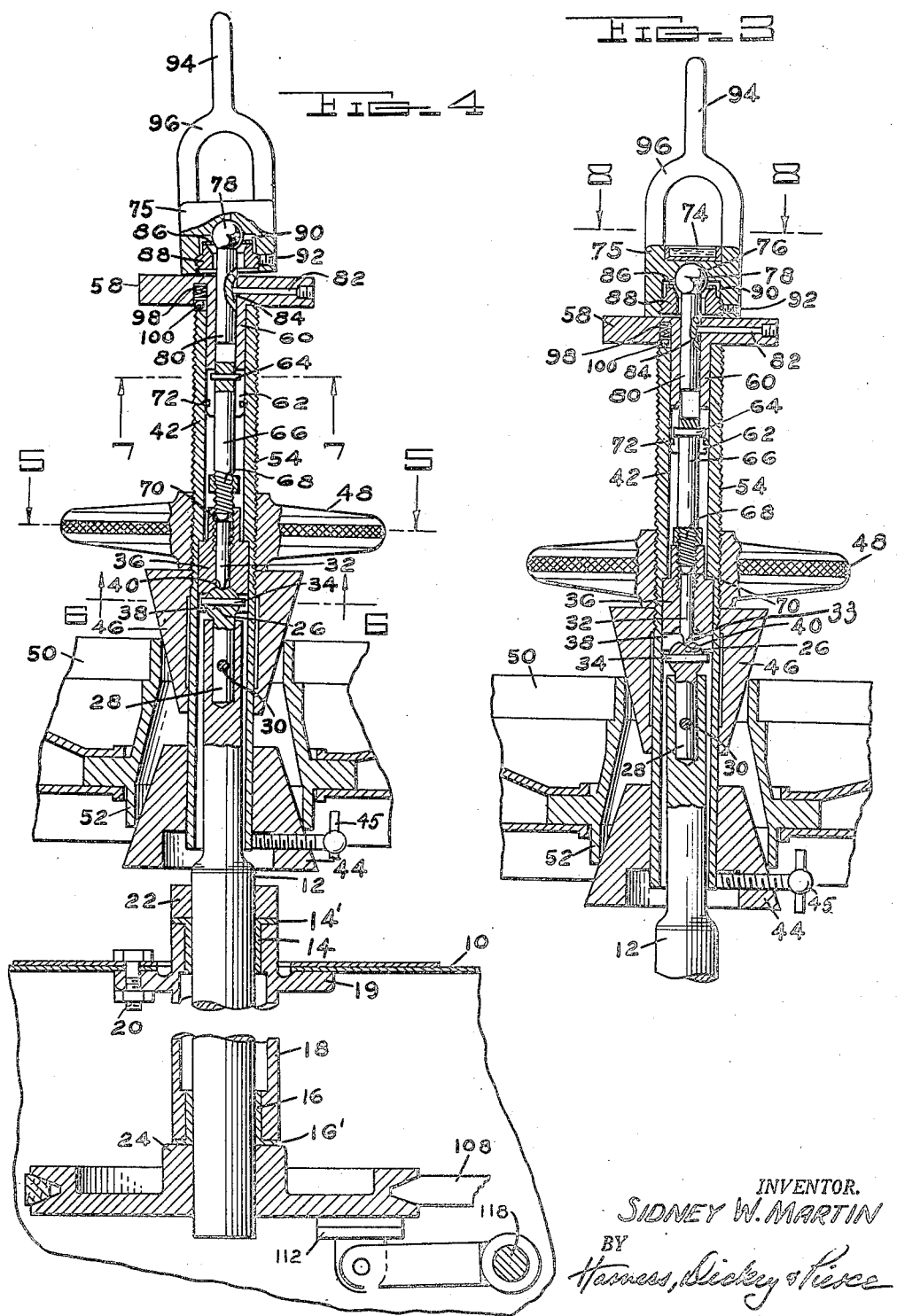

Patented May 15, 1951

2,553,058

UNITED STATES PATENT OFFICE 2,553,058

WHEEL BALANCING MACHINE

Sidney W. Martin, Chicago, Ill., assignor to Bear Manufacturing Company, Rock Island, Ill., a corporation of Delaware Application January 8, 1947, Serial No. 720,833

8 Claims. (Cl. 73—66)

This invention relates to methods and apparatus for testing the balance of and for correcting conditions of unbalance in rotating masses, being particularly useful in balancing the wheels of vehicles, although not restricted to such use.

An important object of the invention is to provide improved and simplified means for quickly and accurately determining conditions of static and dynamic unbalance in wheels and other rotating masses.

Another important object of the invention is to provide such a balance testing device so designed that a wheel to be tested may be very quickly and easily applied to the machine, and removed therefrom, and wherein the mounting of the wheel with respect to the machine may remain unchanged during testing both as to static and dynamic balance.

Another object is to provide such a testing device incorporating a single simple bubble level device which may be employed to indicate both static and dynamic balance conditions.

Still another object is to provide such a combined static and dynamic balance testing device incorporating a bubble-type level adapted to indicate static unbalance and connectible to a wheel in fixed relationship thereto for such purpose, and means also being provided whereby the level may be moved out of such fixed relationship to the wheel for the testing of dynamic unbalance.

An object related to that last stated is to provide a novel level mounting arrangement permitting tilting of the bubble level device while the wheel is rotating but adapted thereafter to hold the level device in any angular position to which it is tilted with respect to the wheel, such tilting being effected in a direction to indicate the axis of dynamic unbalance of the rotating wheel, whereby when the wheel is brought to rest such tilt may serve as an indication of the position of portions of the wheel creating conditions of dynamic unbalance.

Still another object is to provide such a device having novel and simple means for changing the mode of suspension of the wheel during conversion of the machine to adapt it for the performance of different types of tests, as for static and dynamic balance, and including novel and simple interrelated means for making and breaking a driving connection with a source of power whereby the wheel may be rotated during testing of dynamic balance.

Still another object is to provide such a device incorporating improved means for detachably securing the wheel in place during testing.

Other objects will become apparent upon consideration of the present disclosure in its entirety.

In the drawing:

Fig. 2 is a plan view of the machine, a part of the top of the casing being broken away;

Fig. 3 is a substantially diametric vertical sectional view of the wheel supporting and indicating portions of the apparatus, showing the parts in the relative positions they occupy during the testing of a wheel for static unbalance;

Fig. 4 is a similar view with the parts in the relative positions which they occupy during testing of a wheel for dynamic balance, also illustrating additional elements of the driving mechanism;

Figure 1:
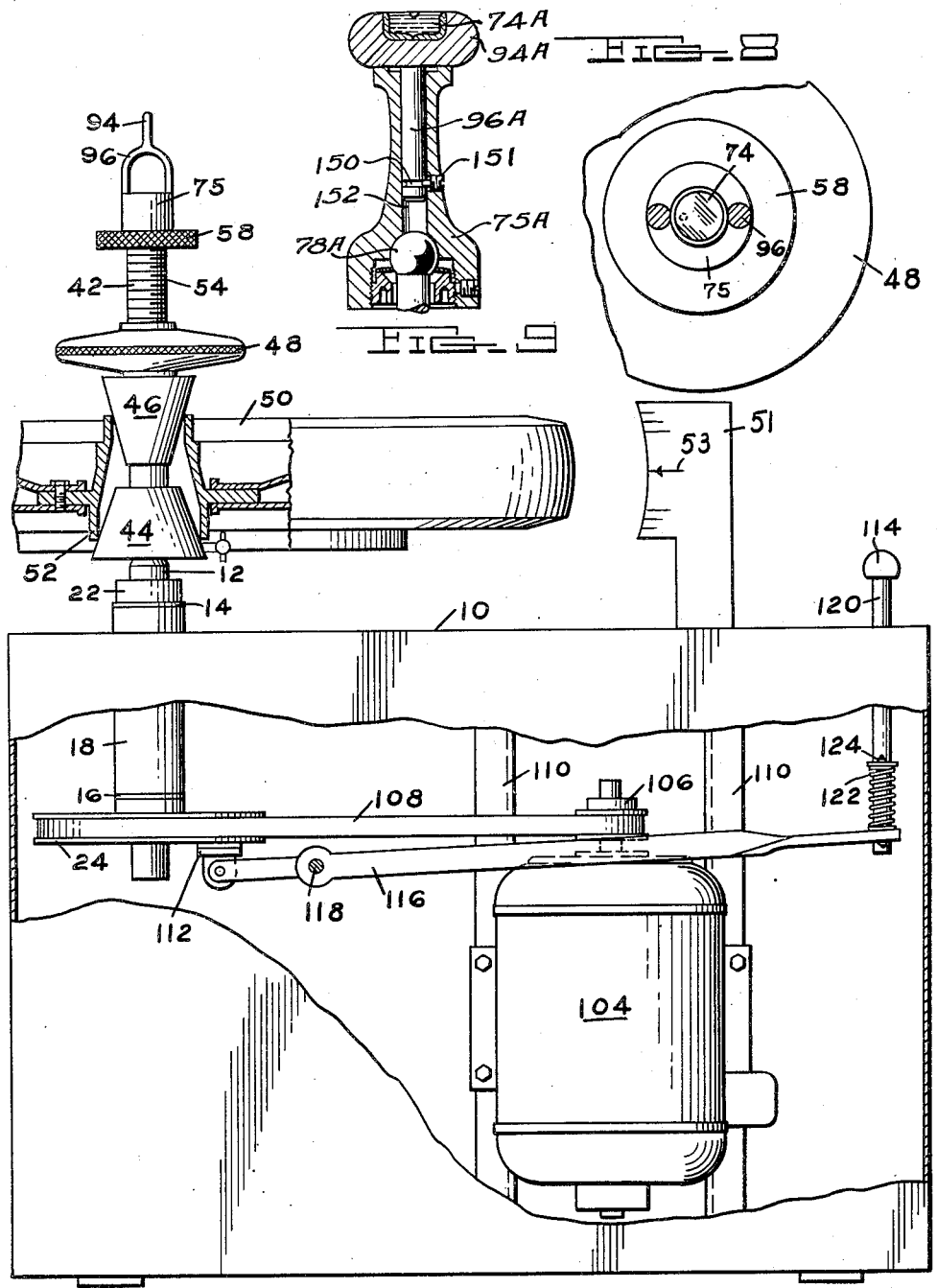
Fig. 1 is a side elevational view of a balance testing device constructed in accordance with the present invention, also illustrating a wheel mounted thereupon in position for testing, parts being broken away and shown in section.

Figs. 5, 6 and 7 are cross-sectional views taken substantially on the lines 5—5, 6—6, and 7—7 respectively of Fig. 4 and looking in the direction of the arrows;

Fig. 8 is a cross-sectional view taken substantially on the line 8—8 of Fig. 3 and looking in the direction of the arrows; and Fig. 9 is a fragmentary view mainly in diametric section but partly in side elevation, showing a somewhat modified construction.

Referring now to the drawing, reference character 10 designates generally a casing, formed of sheet metal or other suitable material, of box-like form, and which is preferably constructed rigidly enough to serve as a support for the principal operating components of the machine. Relatively heavy sheets may be employed, welded together at their margins or otherwise suitably secured, although it will be appreciated that the details of the casing construction are subject to variation and form no part of my present invention.

Rotatably supported by and projecting vertically upwardly from the top of the casing 10 is a shaft 12 journaled in a pair of smooth bearings 14, 16, carried by a tubular support 18 mounted in the top panel of the casing as by bolts 20 projecting through suitable apertures (undesignated) in the top of the casing and through a flange 19 formed integrally with the support 18. The bearings 14, 16 are provided with integral thrust bearing portions 14', 16', respectively overhanging the ends of the support 18. The shaft 12 is positioned by a collar 22 fast upon the shaft above bearing sleeve 14 and by a pulley 24 fast upon the shaft below bearing sleeve 16, the shaft being thereby locked against vertical play. Shaft 12 thus establishes a fixed axis.

Rigidly attached to and projecting coaxially upwardly from the upper end of the shaft 12 is a ball 26 formed integrally with the coaxially disposed stem portion 28 mounted in a suitable axially drilled socket (undesignated) in the upper end of shaft 12. The stem is secured in the socket by a cross pin 30. The ball is formed with an upwardly divergent conical depression 40 in its top, the cone of the depression also being coaxial with the shaft, and the angle of the cone being relatively large so that it forms an effective seat for a pointed pivot bearing portion 33 formed on the lower extremity of a static balancing stem 32. A diametric pin 34 transfixes the ball horizontally, being rigidly secured therein and projecting at its ends therefrom to provide keying means whereby the wheel-supporting structure and the wheel carried thereby may be rotatively driven when the shaft 12 is turned. Such drive is only effective, however, when the dynamic balance-supporting and driving block 36 is lowered with respect to the ball so that the transverse slot 38 formed in the bottom of such block overengages the projecting extremities of the driving pin 34, as indicated in Fig. 4. When the block 36 is raised, the pointed lower extremity 33 of the stem 32 carries the entire load of the wheel and other supported parts, resting in the conical depression 40 in the top of the ball 26. When block 36 is raised, slot 38 is disengaged from pin 34 and the wheel-supporting mechanism cannot then be driven from the shaft 12.

The block 36 is rigidly secured in and serves to support a tubular spindle or quill 42, the internal diameter of which is sufficient to permit it to rock with respect to the shaft 12. Hollow spindle 42 is provided with means for supporting a wheel to be tested, the supporting means for the wheel being such that the geometric axis of the supported wheel, or in other words the intended axis of revolution of the wheel when in service, coincides with the axis of the hollow shaft 42. A frusto-conic wheel-supporting block 44 is slidably mounted upon the lower end of hollow spindle 42, but is normally held against vertical movement by the setscrew 45, loosening of which permits adjustment of the position of the block and so of the height at which the wheel 50 is supported. Block 44 tapers outwardly toward the bottom and is of sufficient size to support the wheel 50 to be balanced by engaging within the hub portion 52 at the inner end of the latter. A co-operating oppositely tapered frusto-conic upper wheel-supporting block 46 is slidably mounted upon the spindle 42 and proportioned to fit into the opposite end of the wheel hub, into which it may be tightly wedged by a handwheel nut 48 threaded upon suitable external threads 64 formed upon the exterior of the spindle.

A second handwheel portion 58 is arranged at the upper extremity of the hollow spindle 42 and rotatably supported with respect thereto. A hollow sleeve portion 60 integral with the handwheel portion 58 projects into and is rotatable in the axial bore of the spindle 42, such sleeve portion being provided at its lower extremity with a transverse slot 62 which normally overengages a cross pin 64 transfixing an axially disposed lifting shaft 66, the lower extremity 68 of which is threaded into a conformably tapped opening 70 in the block 36. The shaft 66 may be turned by rotating the handwheel portion 58 with respect to the hollow spindle 42, and it will be seen that the block 36 may in this manner be raised and lowered with respect to the pin 32 and the shaft 12. At its lower extremity the sleeve 60 is provided with a snap ring 72 engageable in a shallow annular depression (undesignated) in the inner wall of the hollow spindle 42 when the handwheel and its supporting sleeve 60 are pushed all the way down with respect to the spindle 42. The handwheel is thus frictionally held in position with respect to the spindle but freely rotatable with respect thereto and removable from the assembly, together with its stem section 60, simply by pulling up on the handwheel 58 with sufficient force to compress the ring 72 and slide it out of the spindle.

The handwheel and sleeve assembly 58, 60 also supports a circular universal bubble-type spirit level 74 as shown in Figs. 3 and 8, mounted in a cylindrical holder 75. The base of the level holder 75 and the top surface of the handwheel 58 are square and truly perpendicular to the axis of the spindle 42, and the level 74 is thereby accurately held in perpendicular relation to such axis, when the base of the holder 75 is in engagement with the top surface of handwheel portion 58. Holder 75 is provided with an axially disposed socket portion 76 rotatably overengaging a ball 78 rigidly carried by and at the upper end of a vertically slidable axially disposed rod 80 supported in the axial bore of the sleeve portion 60. Sliding movement of rod 80 is limited by a keying pin 82 carried by the handwheel and projecting into a slot 84 longitudinally cut in the surface of the rod. A resilient take-up washer 86 embraces the ball 78 below the center of the latter and is urged against the underside of the ball by a threaded take-up collar 88 fitted into a suitably internally threaded socket 90 formed in the underside of the holder 75. The take-up collar may be locked in position by means of a set screw 92. The engagement between the socket and ball portions 76, 78 provides sufficient friction to maintain the holder 75 at any relative angle to which it may be tilted. It will be seen also that the axis of holder 75 and handle 94 may tilt in a universal manner with respect to both the established axis of the spindle 12 and the intended axis of rotation of the wheel defined by the axis of hollow spindle 42, against centrifugal force developed by rotation of the wheel and supporting means. It will be seen that when the holder is tilted the rod 80 is pulled upwardly, and that when the holder is pushed down against the top of handwheel portion 58 the rod 80 slides into the sleeve portion 60. An axially disposed fingerpiece 94 in the form of a smooth rod having a rounded tip projects upwardly from the support 75, being carried by a yoke-type supporting portion 96 which does not interfere with ready visibility of the level 74.

The top of the spindle 42 is provided with a notch (undesignated) in a predetermined angular position with which a click ball 100 is interengageable to designate a predetermined angular relationship between the handwheel and the spindle. A spring 98 urges the ball into the notch but the effort exerted by spring 98 is insufficient to contract the snap ring 72.

Pulley 24 and spindle 12 are drivable by a motor 104, the driving pulley 106 of which is connected by a belt 108 to the pulley 24. The motor is mounted in the casing as by attachment to suitable vertical rails 110, as shown in Fig. 1.

The bottom of the pulley 24 is provided with a flush horizontal surface against which a brake shoe 112 is adapted to be urged by means of a handle portion 114 projecting accessibly from the top of the casing and acting upon the brake shoe through the agency of a lever 116 pivotally supported in the casing by means of the transverse pivot pin 118. The handle portion 114 is mounted upon a vertically slidable rod 120 which projects into the interior of the casing and through a hole (undesignated) in the rear end of the lever 116, sufficient clearance being provided to permit relative rocking movement between the lever and rod, and the braking effort developed by downward movement of the handle being transmitted through a helical compression spring 122 mounted upon the rod and interposed between the upper face of the lever and an abutment pin 124 transfixing the rod. The spring will be seen to limit the effective effort which may be applied to the brake shoe.

In the operation of the device to test the static balance of a wheel as 50 mounted thereupon, handwheel 58 is so turned as to raise the block 36, together with the spindle 42 and the wheel carried thereby to the relative positioning indicated in Fig. 3. It will be noted that the slotted portion 38 of block 36 is then free of the pin 34 and that the entire hollow spindle assembly and wheel are free to rock, with pin 32, in the conical seat 40 provided in the top of ball 26. The level holder 75 is at this time in the position shown in Fig. 3, the lower surface of the level holder bearing against the top of the handwheel 58 so that the bubble of the level indicates any tilt of the axis of the wheel and spindle from the true vertical. The bubble will then travel to the light side of the wheel and static balance may of course be restored by applying to such light side of the wheel enough weight to restore the bubble to the center position.

To test for dynamic balance, handwheel 58 is first turned to lower the block 36 until its spherical bottom portion bears against the top of the ball 26 and carries the load represented by the spindle, the parts carried thereby, and the wheel under test. The handwheel is also turned far enough to back the shaft 66 entirely clear of pin 32. The pin 32 is thus free to move up sufficiently so that no binding occurs during any tilting movement of the assembly on the supporting ball 26.

The height of the wheel under test above the top of cabinet 10 when hanging level is then checked. All wheels to be tested, regardless of their dimensions and the shape of their hub parts, are supported with the center of the tread of the tire at a predetermined height. A height gage 51 mounted on the cabinet near the position of the tire periphery may be provided to assist in determining the wheel height, which is adjusted by backing up the clamping hand nut 48, loosening the setscrew 45 and moving block 44 to a position to bring the center of the tread of the tire to horizontal alignment with the center marking 53 of the height gage. The hub of the wheel is then reclamped by tightening the hand nut 48. This adjustment insures the supporting of all wheels with their centers of gravity approximately at a known predetermined height with relation to the height of the rocking center represented by the center of ball 26.

The motor 104 is then started by suitable switching means (not shown) and in the resulting rotation of the wheel any dynamic unbalance is indicated by tilting of the wheel and of the spindle 42 about an axis transverse to that of the shaft 12. The axis of tilt will rotate with the wheel so that spindle 42 will appear to wobble, its upper portion describing an inverted conic figure having its apex at the center of the ball 26. If the tip of the fingerpiece 94 is then grasped by the hand, it may be tilted to such angle that the top thereof returns to alignment with the axis of the shaft 12. This may easily be done simply by grasping the top of the fingerpiece, while permitting the parts to continue to rotate. Assuming that the extent of dynamic unbalance is such as to cause a tilt of the wheel of the order indicated in Fig. 4, a corresponding reverse tilt is thus imparted to the fingerpiece 94 and to the connected level holder 75 and spirit level 74, as also indicated in that view. The tip of the fingerpiece may then be released and the frictional engagement between the ball and socket portions 78, 76 is sufficient to maintain such tilt of the level while the parts continue to rotate and until motion of the wheel is arrested. The brake mechanism previously described may be used to stop the wheel without waiting for the parts to run down. The bubble will then indicate the diametric line of the wheel to which weights must be applied to restore dynamic balance. The side to which the bubble has traveled will be the side which was low while the wheel was rotating.

The vertical distance from the center of gravity of the wheel to the center of ball 26 is so related to the vertical distance from the center of the ball 26 to the spirit level, and to the length of fingerpiece 94 and the radius of the convex top glass of the spirit level 74, that the amount of weight required to be laid on top of the wheel at approximately the rim distance from the center thereof to bring the bubble back to center without disturbing the angular relationship between the level holder 75 and the spindle 42, represents one-half the weight required, at the rim, to dynamically balance the wheel. I have not developed a formula or mathematical method of determining the necessary dimensions and values of the parts in question, but they may readily be found empirically. The diameters of rims and wheels of modern passenger automobiles vary only slightly from one another, so that the results attained by this novel method of testing dynamic balance constitute close approximations which are accurate within entirely practical limits.

It will be appreciated that with the parts arranged in the manner described, it is merely necessary to lay weights on top of the wheel at the rim, in radial alignment with the bubble, until the bubble is brought back to center, and then fasten these weights to the underside of the rim at that radial position, and to fasten an equal amount of weight to the top of the rim at a diametrically opposite position on the wheel. A couple is thus developed which is substantially equal and opposite to that resulting from the dynamically unbalanced mass of the wheel. Since the results are necessarily approximate, however, as indicated above, I prefer to thereafter run the same dynamic balance test a second time, and again correct any remaining dynamic unbalance in the same manner. This normally results in achieving dynamic balance which is substantially perfect within practical limits in that all apparent wobble is eliminated. Perfect dynamic balance will be indicated by ability to push the level holder down to flush engagement with the top of the handwheel 58 with the parts running and while the fingerpiece 94 continues to run true and without wobble.

In the somewhat modified construction shown in Figure 9, the fingerpiece 94A carries the spirit level 74A and is rotatable with respect to the longitudinal axis of the level holder 75A. The level holder is similarly rockably connected to the ball 78A, which corresponds to the ball 78 of the embodiment first described, and the parts below which may be identical to those of the first embodiment. The level holder 75A is upwardly elongated, however, and provided with an axial bore 152 within which a stem 96A is rotatable. The head 94A is affixed to the upper end of stem 96A, and the stem and head are held against unintentional removal by a pin 151 fitting loosely into a peripheral slot 150 in the stem. With this arrangement the fingerpiece does not turn when gripped by the operator, although it may be brought to center in the same manner and the operation of the device is essentially the same in that the level indicates the direction and extent of unbalance in like fashion, although the parts are dimensioned somewhat differently, as will be apparent when the level is supported in a higher relative position in this modified manner.

While it will be apparent that the preferred embodiments of my invention herein described are well calculated to fulfill the objects first above stated, it will be apparent that the invention is susceptible to variation, modification and change within the spirit and scope of the subjoined claims.

I claim:

1. In a combined static and dynamic balancing machine for wheels and the like, a driving shaft adapted to be rotated about a substantially vertical axis, a hollow spindle surrounding the upper portion of and projecting upwardly from said shaft and of larger diameter than the shaft whereby said spindle is limitedly rockable with respect to the shaft, means for supporting a wheel or the like to be tested upon the spindle, ball and socket-type coupling means providing a rocking connection between said shaft and spindle, and including separable driving portions normally interengaged to provide a driving connection between said spindle and shaft without preventing relative rocking movement thereof, and means carried by said spindle for separating said driving portions to prevent imparting a rotary drive to said spindle without preventing relative rocking movement of the same with respect to the shaft.

2. Means as set forth in claim 1 in which said coupling means comprising a bearing portion of substantially spherical contour carried by the top of said shaft, and a cooperating interfitted spherical bearing portion interiorly carried by the spindle, an upwardly facing static pivot bearing portion fixedly carried by the first mentioned bearing portion, and a combined static pivot bearing and lifting element axially carried by the spindle and forming part of said separating means and adapted to rockably seat in said first mentioned static pivot bearing portion and movable to urge the spindle upwardly to separate said driving portions from one another and simultaneously to separate said spherical bearing portions from one another, and thereby to cause the entire load of the spindle to be carried by the static pivot bearing portions.

3. Means as set forth in claim 1 in which said coupling means comprises a ball element fixedly carried by the top of the shaft, a socket bearing carried by the spindle and engageable with said ball when said driving portions are interengaged to provide a universal joint type drive between the shaft and spindle, a generally conic static bearing seat portion axially formed in the top of said ball, said means for separating the driving portions including a static pivot bearing portion carried by and axially movable in said spindle and engageable with said static bearing seat, and means carried by the spindle for moving the spindle upwardly with respect to the pivot bearing portion sufficiently to raise the socket clear of the ball and to separate said driving portions whereby the spindle remains supported by said pivot bearing and static bearing seat and is rockable with relation to but not drivable by said shaft.

4. In combination with means as set forth in claim 1, a level indicating device carried by said spindle, locating portions carried partly by the spindle and partly by the level indicating device for positioning said indicating device in known angular relationship to the spindle, and connecting means including a universal joint interconnecting the indicating device and spindle but permitting rocking of the indicating device with respect to the spindle.

5. In combination with means as set forth in claim 1, spirit level means, universal joint means connecting the spirit level means to the spindle at a position spaced from said coupling means, friction means for holding said spirit level means in any angular position to which it may be moved with respect to the spindle, and means for denoting alignment of the spirit level means with respect to the spindle to assist in determining when the shaft and spindle are axially parallel to one another.

6. Means for dynamically balancing a revoluble mass, comprising means for supporting and rotating the mass about an established axis of rotation while permitting universal tilting movement of the mass whereby during such rotation it may rock about a center lying on said established axis in response to any dynamic unbalance, means for ascertaining any such dynamic unbalance comprising a level indicating device, means for coupling the level indicating device for rotation and bodily movement with the mass and for universal independent rocking movement with respect to said means for supporting the mass and with respect to said mass, about a center spaced from the previously mentioned center but lying substantially on the intended axis of rotation of the mass, and a manipulating portion connected to said level indicating device for rocking the same about said second-mentioned center, said manipulating portion being spaced longitudinally with respect to both of said centers and located on the farther side of said centers from said means for supporting the mass, said manipulating portion being movable laterally to and from a position in alignment with said established axis whereby such manipulating portion may be returned to alignment with said established axis during rotation of the mass and while the mass is tilted with respect to said established axis due to dynamic unbalance, and whereby such return of the manipulating portion while the mass is rotating in an unbalanced condition tilts said manipulating portion in a direction opposite to the direction in which the mass is tilted due to dynamic unbalance of the latter, and such opposite tilt rocks the level indicating device to a corresponding angle with relation to the mass, and friction means for maintaining the tilt of the level indicating device until rotation of the mass is stopped, whereupon the level indicating device designates the direction in which and extent to which the mass was tilted while rotating.

7. Means for determining dynamic unbalance of a revoluble mass, including a supporting spindle mounted upon a fixedly established axis, means including a hollow quill rockably and rotatably supported by the spindle and defining an intended axis of rotation of the mass, the mass being supportable upon the quill to rotate and tilt therewith, a tilt indicating device, a universal joint-type support for securing said tilt indicating device to the quill and mass for rotation and bodily movement with the quill and mass and also for independent rocking movement with relation both to said quill and spindle about a center in alignment with the intended axis of rotation of the mass defined by said quill, means for rotating the mass about said established axis defined by said spindle while permitting the quill and mass to tilt about a common center spaced from the first-mentioned center and located on both of said axes, whereby the intended axis and the established axis may assume an angular relationship to one another in response to any dynamic unbalance of the mass, and whereby said tilt indicating device may also assume a corresponding angular relationship with respect to the established axis, holding means for retaining the tilt indicating device in any angular position to which it may be rocked with relation to the quill and mass, and a longitudinally extending manipulating handle portion operatively connected to the tilt indicating device for rocking the same about said first-mentioned center, said handle portion extending, in a direction substantially longitudinal with respect to both of said axes, to a position beyond one end of said quill, and beyond an end of the shaft, said handle being movable laterally of the quill to and from a position in alignment with both the established axis defined by said spindle and the intended axis defined by said quill.

8. Means as defined in claim 7 wherein said holding means comprises friction means incorporated in said universal joint-type support to perform said function of holding the tilt indicating device in any angular position, and a grip section carried by said manipulating handle portion and freely rotatable with respect thereto about an axis substantially coincident with the direction in which said handle portion extends whereby rotation of the grip section may be arrested without interfering with rotation of the handle portion or other parts of the assembly.

SIDNEY W. MARTIN.

REFERENCES CITED

The following references are of record in the file of this patent:

UNITED STATES PATENTS

| Number    | Name   | Date          |
|-----------|--------|---------------|
| 2,110,343 | Taylor | Mar. 8, 1938  |
| 2,211,779 | Holmes | Aug. 20, 1940 |
| 2,298,656 | Smith  | Oct. 13, 1942 |